(12) United States Patent
Lee et al.

(10) Patent No.: US 12,002,227 B1
(45) Date of Patent: Jun. 4, 2024

(54) DEEP PARTIAL POINT CLOUD REGISTRATION OF OBJECTS

(71) Applicant: Apple Inc., Cupertino, CA (US)

(72) Inventors: Donghoon Lee, Cupertino, CA (US); Thorsten Gernoth, San Francisco, CA (US); Onur C. Hamsici, Palo Alto, CA (US); Shuo Feng, San Jose, CA (US)

(73) Assignee: Apple Inc., Cupertino, CA (US)

( * ) Notice: Subject to any disclaimer, the term of this patent is extended or adjusted under 35 U.S.C. 154(b) by 536 days.

(21) Appl. No.: 17/376,313

(22) Filed: Jul. 15, 2021

Related U.S. Application Data

(60) Provisional application No. 63/070,446, filed on Aug. 26, 2020.

(51) Int. Cl.
*G06T 7/33* (2017.01)
*G06N 3/08* (2023.01)
*G06T 15/20* (2011.01)

(52) U.S. Cl.
CPC .............. *G06T 7/344* (2017.01); *G06N 3/08* (2013.01); *G06T 15/205* (2013.01); *G06T 2207/20081* (2013.01); *G06T 2207/20084* (2013.01)

(58) Field of Classification Search
CPC .............. G06T 7/344; G06T 17/205; G06T 2207/20081; G06T 2207/20084; G06N 3/08
See application file for complete search history.

(56) References Cited

U.S. PATENT DOCUMENTS

| | | | |
|---|---|---|---|
| 9,183,631 B2 | 11/2015 | Taguchi et al. | |
| 9,525,862 B2 | 12/2016 | Benhimane et al. | |
| 10,663,594 B2 | 5/2020 | Tsishkou et al. | |
| 11,295,517 B2 * | 4/2022 | Zhou | G06V 20/10 |
| 2009/0232388 A1 | 9/2009 | Minear et al. | |
| 2022/0156965 A1 * | 5/2022 | Zheng | G06F 18/214 |

* cited by examiner

*Primary Examiner* — Daniel G Mariam
(74) *Attorney, Agent, or Firm* — Thompson Hine LLP

(57) ABSTRACT

Devices, systems, and methods are disclosed for partial point cloud registration. In some implementations, a method includes obtaining a first set of three-dimensional (3D) points corresponding to an object in a physical environment, the first set of 3D points having locations in a first coordinate system, obtaining a second set of 3D points corresponding to the object in the physical environment, the second set of 3D points having locations in a second coordinate system, predicting, via a machine learning model, locations of the first set of 3D points in the second coordinate system, and determining transform parameters relating the first set of 3D points and the second set of 3D points based on the predicted location of the first set of 3D points in the second coordinate system.

20 Claims, 5 Drawing Sheets

DEEP PARTIAL POINT CLOUD REGISTRATION OF OBJECTS

CROSS-REFERENCE TO RELATED APPLICATIONS

This Application claims the benefit of U.S. Provisional Application Ser. No. 63/070,446 filed Aug. 26, 2020, which is incorporated herein in its entirety.

TECHNICAL FIELD

The present disclosure generally relates to generating three-dimensional (3D) point cloud registration of objects in physical environments, and in particular, to systems, methods, and devices that determine 3D rotation and translation parameters for 3D representations of the objects.

BACKGROUND

Geometric registration and pose estimation are gaining more attention with the growing application in robotics, autonomous driving, and augmented reality and widely available sensors from LIDAR on autonomous vehicles to RGB-D sensor on mobile devices. Point cloud registration aims to align two three-dimensional (3D) point clouds by predicting the 3D rotation and translation parameters. Point cloud registration plays a critical role for a number of applications ranging from constructing a wide-range outdoor map around autonomous vehicles to reconstructing indoor-scale structure or small-scale object 3D model. However, 3D point cloud registration techniques for registering small spatial scale partial point clouds from real-world objects in real-time have various deficiencies.

Existing techniques for aligning two 3D point clouds may utilize matching key points using an algorithm that first extracts matching points between two point clouds and then second, moves one point cloud to the other based on the predicted rotation and translation parameters. These two steps are iterated until convergence. Theses existing techniques that focus on matching key points between two 3D point clouds are challenged to find point correspondences since matching key points requires costly combinatorial matching problems and convergence to local optima depending on the initialization.

SUMMARY

Devices, systems, and methods are disclosed that registers two or more partial three-dimensional (3D) point clouds for 3D representations of objects in physical environments. For example, registration of the partial 3D point clouds includes determining rotation and translation parameters between two partial point clouds (e.g., captured by a depth sensor from different viewpoints). The techniques described herein may use a deep neural network which receives two partial point clouds as input and predicts point-wise locations of one point cloud in the other's coordinate system without explicitly matching points to other points (e.g., without using key point matching).

In general, one innovative aspect of the subject matter described in this specification can be embodied in methods that include the actions of obtaining a first set of three-dimensional (3D) points corresponding to an object in a physical environment, the first set of 3D points having locations in a first coordinate system, obtaining a second set of 3D points corresponding to the object in the physical environment, the second set of 3D points having locations in a second coordinate system, predicting, via a machine learning model, locations of the first set of 3D points in the second coordinate system, and determining transform parameters relating the first set of 3D points and the second set of 3D points based on the predicted location of the first set of 3D points in the second coordinate system.

These and other embodiments can each optionally include one or more of the following features.

In some aspects, the first and second sets of 3D points are obtained via a depth sensor. In some aspects, the second coordinate system is different than the first coordinate system. In some aspects, the first set of 3D points are obtained at a first viewpoint and the second set of 3D points are obtained at a second viewpoint different than the first viewpoint. In some aspects, the first set of 3D points are obtained at a first viewpoint and the second set of 3D points are obtained at a second viewpoint that is the same as the first viewpoint.

In some aspects, the machine learning model is a neural network. In some aspects, the first set of 3D points includes a particular order and the neural network outputs the locations of the first set of 3D points in the second coordinate system such that the order of the first set of 3D points is preserved. In some aspects, the neural network is trained to encode features corresponding to the object and generate the predicted locations of the first set of 3D points based on the encoded features.

In some aspects, preceding predicting the locations of the first set of 3D points in the second coordinate system via the machine learning model, the method may further include determining local and global features of the first and second set of 3D points. In some aspects, the predicted locations of the first set of 3D points are based on the local and the global features of the first set of 3D points and the global features of the second set of 3D points.

In some aspects, the method further includes predicting, via the machine learning model, locations of the second set of 3D points in the first coordinate system.

In some aspects, the method further includes obtaining two or more sets of 3D points corresponding to the object in the physical environment, where each of the two or more sets of 3D points have locations in a respective coordinate system, predicting, via the machine learning model, locations of the first set of 3D points in each of the two or more coordinate systems associated with the two or more sets of 3D points, and determining transform parameters relating the first set of 3D points and each of the two or more sets of 3D points based on the predicted location of the first set of 3D points in each of the two or more coordinate systems associated with the two or more sets of 3D points.

In some aspects, preceding predicting the locations of the first set of 3D points in the second coordinate system via the machine learning model, the method further includes randomly rotating a viewpoint of at least one of the first set of 3D points and the second set of 3D points, and predicting the locations of the first set of 3D points in the second coordinate system based on the random rotation of the viewpoint of the at least one of the first set of 3D points and the second set of 3D points. In some aspects, preceding determining the transform parameters relating the first set of 3D points and the second set of 3D points, the method further includes reversing the random rotation of the viewpoint of the at least one of the first set of 3D points and the second set of 3D points.

In some aspects, the transform parameters include at least one of rotation parameters and translation parameters.

In some aspects, the location prediction and/or the transform determination are performed via one or more neural networks trained using ground truth data that includes: (i) known transform parameters, and (ii) one or more distance losses based on a measured distance between a ground set of 3D points transformed based on the predicted transform parameters and the known transform parameters.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
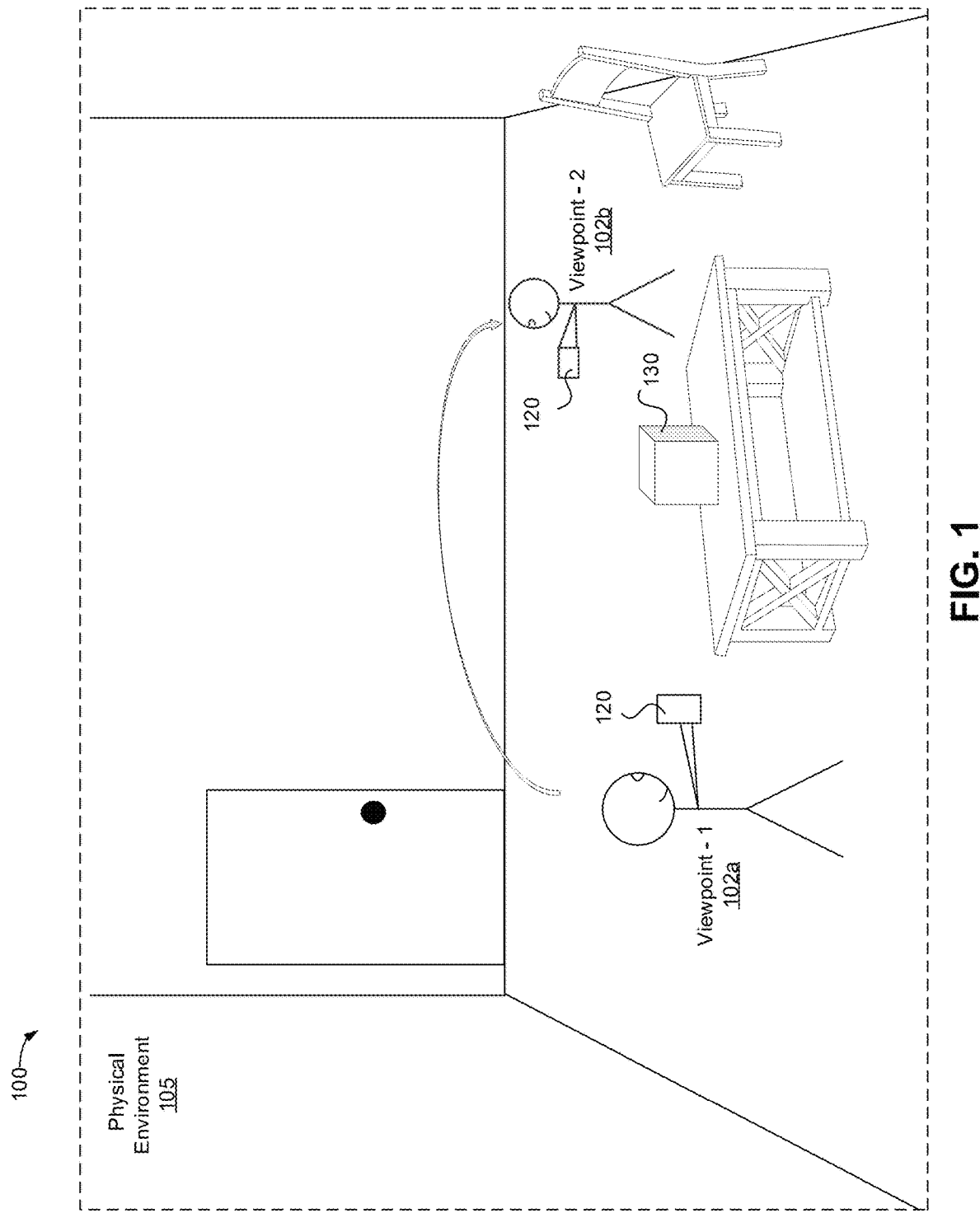
FIG. 1 illustrates an exemplary operating environment during a first and a second image capture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary operating environment 100 in which electronic device 120 is used in physical environment 105. The physical environment 105 includes an exemplary three-dimensional (3D) object, e.g., object 130. Device 120 includes one or more cameras that capture images of the physical environment 105, including the object 130. The device 120 captures a first image of the object 130 at viewpoint-1 102a, and captures a second image of the object 130 at viewpoint-2 102b.

The device 120 is illustrated as a single device. Some implementations of device 120 are hand-held. For example, device 120 may be a mobile phone, a tablet, a laptop, and so forth. In some implementations, device 120 is worn by a user. For example, device 120 may be a watch, a head-mounted device (HMD), head-worn device (glasses), so forth. In some implementations, functions of the device 120 are accomplished via two or more devices, for example additionally including a base station. Other examples of additional devices include a laptop, desktop, server, or other such device that includes additional capabilities in terms of power, CPU capabilities, GPU capabilities, storage capabilities, memory capabilities, and the like. The multiple devices that may be used to accomplish the functions of device 120 may communicate with one another via wired or wireless communications.

Figure 2:
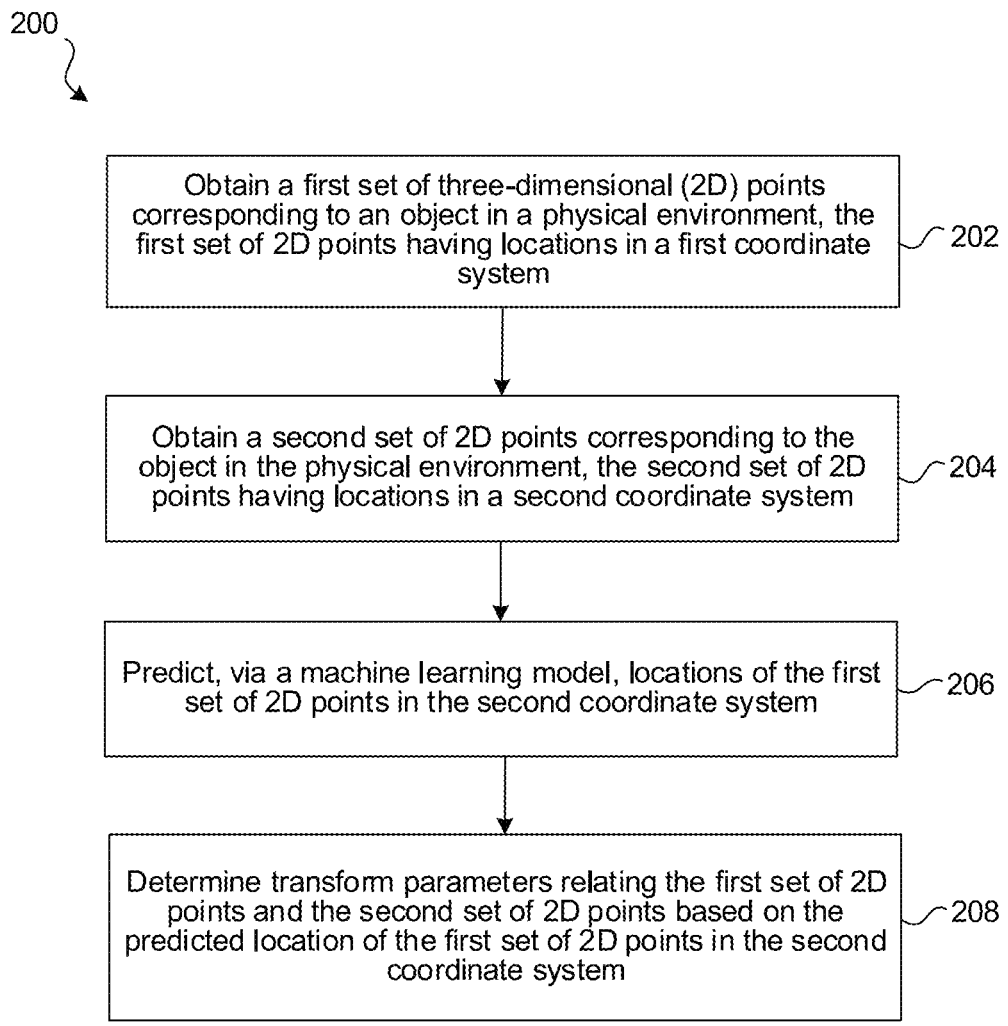
FIG. 2 is a flowchart illustrating determining transform parameters for two sets of three-dimensional (3D) points in accordance with some implementations.

FIG. 2 is a flowchart illustrating an exemplary method 200. In some implementations, a device, such as device 120 in FIG. 1, performs the techniques of method 200 to determine transform parameters (e.g., rotation and translation) for two or more partial point clouds of a 3D object, such as object 130 in FIG. 1. In some implementations, the device is, desktop, laptop, HMD, or server device. In some implementations, the method 200 is performed on processing logic, including hardware, firmware, software, or a combination thereof. In some implementations, the method 200 is performed on a processor executing code stored in a non-transitory computer-readable medium (e.g., a memory).

At block 202, the method 200 obtains a first set of three-dimensional (3D) points corresponding to an object in a physical environment, the first set of 3D points having locations in a first coordinate system. In some implementations, the 3D points are obtained from images that include RGB, IR, or other light-intensity images captured by a camera. In some implementations, the images include depth data obtained via a depth sensor. In some implementations, the images include values representing information about each pixel position in a grid of pixel positions (e.g., a 3D point cloud). In some implementations, the images include metadata providing information about the images or particular portions (e.g., pixels) of the images. For example, an image may include metadata that semantically labels portions of the image determined via a semantic labelling technique, e.g., by processing each image using a neural network that generates semantic labels. The 3D object may be a single object (e.g., a coffee mug), a group of objects (e.g., a place setting), an entire scene, or any other grouping of one or more 3D objects.

At block 204, the method 200 obtains a second set of 3D points corresponding to the object in the physical environment, the second set of 3D points having locations in a second coordinate system. In some implementations, the second coordinate system is different than the first coordinate system. For example, two sets of 3D points taken from two different viewpoints of the same object. Alternatively, the second coordinate system is the same as the first coordinate system. For example, two sets of 3D points taken from the same viewpoint of the same object (e.g., the electronic device 120 is not moving or a user visited the same viewpoint at a later time, i.e., two different time stamps). In some implementations, the sets of point clouds may be sets of points identified as corresponding to a particular object, e.g., using semantically labelled point cloud.

At block 206, the method 200 predicts, via a machine learning model, locations of the first set of 3D points in the second coordinate system. For example, a neural network may be trained to predict the first point cloud's location in the second's coordinate system in a way that preserves the ordering of the first point cloud's points. For example, the neural network may encode features (local and global) and generate the predicted locations of the first set of 3D points based on the encoded features. In some implementations, the encoded features may be local and global. For example, the predicted locations are predicted based on local and global features of the first set of 3D points and global features of the second set of 3D points. Additionally, or alternatively, in another example, predicted locations of the second set of 3D points in the first coordinate system can also be made.

In some implementations, one or both of the sets of 3D points can be randomly rotated before being input to the neural network. For example, in an exemplary implementation, before predicting the locations of the first set of 3D points in the second coordinate system via the machine learning model, the method 200 may further include randomly rotating a viewpoint of at least one of the first set of 3D points and the second set of 3D points, and predicting the locations of the first set of 3D points in the second coordinate system is based on the random rotation of the viewpoint of the at least one of the first set of 3D points and the second set of 3D points. In some implementations, the random rotation of the viewpoint of the at least one of the first set of 3D points and the second set of 3D points is reversed before block 208 and the transform parameters are determined.

At block 208, the method 200 determines transform parameters (e.g., rotation and translation) relating the first set of 3D points and the second set of 3D points based on the predicted location of the first set of 3D points in the second coordinate system. In some implementations, the transformed parameters are related to the first set of 3D points and the second set of 3D points based on the first set of 3D points in the first coordinate system and the predicted location of the first set of 3D points in the second coordinate system. In some implementations, the transform parameters may be estimated using a transform estimation neural network. The location prediction and transform determination may be performed by one or more neural networks trained using (a) ground truth data including known transform parameters (e.g., based on motion sensors on the depth camera, motion tracking, etc.), and (b) one or more distance losses based on a measured distance between one point cloud transformed using the predicted transform parameters and the other translated using the known transform parameters.

In some implementations, the transform parameters include at least one of rotation parameters and translation parameters. In some implementations, the location prediction and/or the transform determination are performed via one or more neural networks trained using ground truth data that includes: (i) known transform parameters, (e.g., based on motion sensors on the depth camera, motion tracking, etc.), and (ii) location of a set of 3D points translated based on the known transform parameters. In some implementations, the ground truth data includes: (i) the known transform parameters, and (ii) one or more distance losses based on a measured distance between a ground set of 3D points transformed based on the predicted transform parameters and the known transform parameters (e.g., one point cloud transformed using the predicted transform parameters ($x12$, $x21$) and the other translated using the known transform parameters ($x12^*$, $x21^*$)).

In some implementations, the techniques described herein can handle multiple sets of 3D points (e.g., point clouds) as input. For example, method 200 may further include obtaining two or more sets of 3D points corresponding to the object in the physical environment, where each of the two or more sets of 3D points have locations in a respective coordinate system, predicting, via the machine learning model, locations of the first set of 3D points in each of the two or more coordinate systems associated with the two or more sets of 3D points, and determining transform parameters relating the first set of 3D points and each of the two or more sets of 3D points based on the predicted location of the first set of 3D points in each of the two or more coordinate systems associated with the two or more sets of 3D points.

Figure 3:
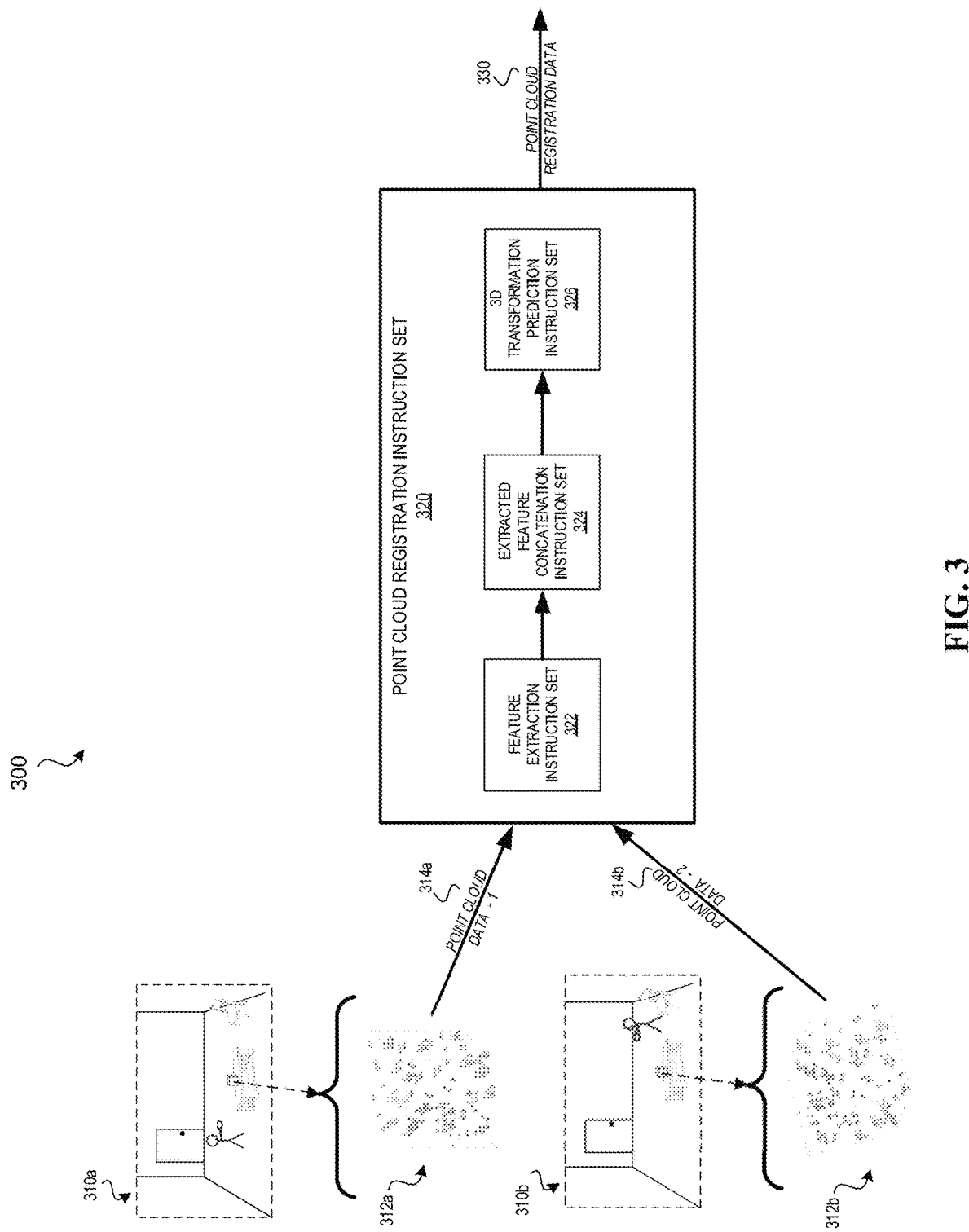
FIG. 3 illustrates a system flow diagram for partial point cloud registration in accordance with some implementations.
Figure 4:
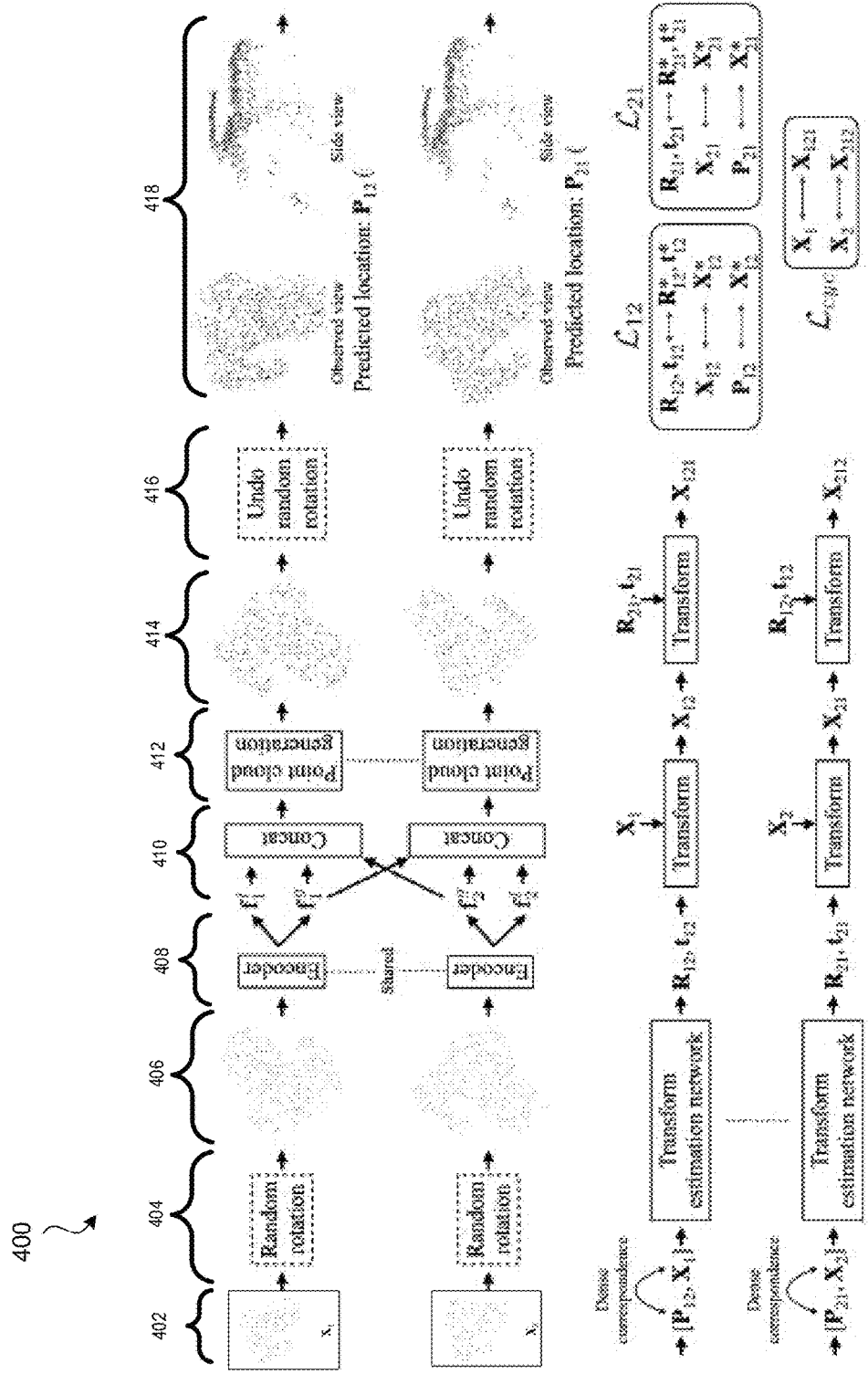
FIG. 4 illustrates training a partial point cloud registration algorithm in accordance with some implementations.

This point cloud registration process of method 200 is further described herein in greater detail with reference to FIGS. 3-4.

FIG. 3 illustrates a system flow diagram of an example environment 300 in which a completion system can process partial point cloud registration between two partial point clouds according to some implementations. In some implementations, the system flow of the example environment 300 is performed on a device (e.g., device 120 of FIG. 1), such as a mobile device, desktop, laptop, or server device. In some implementations, the system flow of the example environment 300 is performed on processing logic, including hardware, firmware, software, or a combination thereof. In some implementations, the system flow of the example environment 300 is performed on a processor executing code stored in a non-transitory computer-readable medium (e.g., a memory).

The system flow of the example environment 300 acquires partial point cloud data from sensors of a physical environment (e.g., the physical environment 105 of FIG. 1), extracts features from the partial point cloud data, executes concatenation which replicates global features from a first point cloud and then concatenates them with global features and local features from a second point cloud, predicts the 3D transformation parameters (e.g., rotation and translation) for one or more partial point clouds, and integrates the resulting information via point cloud registration data. For example, a partial point cloud registration technique described herein finds rotation and translation parameters between two partial point clouds without knowing the 3D model of the object. An example implementation of training a partial point cloud registration algorithm for example environment 300 is further described herein with reference to FIG. 4.

In an example implementation, the environment 300 includes a partial point cloud pipeline that acquires or obtains partial point cloud data (e.g., a 3D point cloud of an object generated from a single frame of image data) of the physical environment. Example environment 300 is an example of acquiring a first partial point cloud 312a of an object acquired from a first viewpoint as shown image 310a and a second partial point cloud 312b of an object acquired from a second viewpoint as shown image 310b. For example, image 310a represents a user acquiring image data of an object at a first viewpoint as the user scans a room in a physical environment (e.g., object 130 of the physical environment 105 of FIG. 1), and image 310b represents a user acquiring image data of the same object at a second viewpoint. Additionally, or alternatively, although FIG. 3 illustrates the partial point clouds being captured at different points of views, other embodiments can capture two different partial point clouds from the same point of view as the object rotates (e.g., like on a turntable).

The image source(s) of the device (e.g., device 120 of FIG. 1) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 300 includes a point cloud registration instruction set 320 that is configured with instructions executable by a processor to generate point cloud registration data using one or more techniques disclosed herein. For example, the point cloud registration instruction set 320 extracts features of each partial point cloud associated with an object (e.g., point cloud data-1 314a and point cloud data-2 314b), replicates global features from a first point cloud and then concatenates them with global features and local features from a second point cloud, and predicts the 3D transformation parameters (e.g., rotation and translation) for one or more partial point clouds by bypassing the combinatorial matching and is based on the dense correspondence between the first set of 3D points in the first coordinate system and the predicted location of the first set of 3D points in the second coordinate system. This point cloud registration process of example environment 300 is further described herein in greater detail with reference to FIG. 4.

In some implementations, the point cloud registration instruction set 320 includes a feature extraction instruction set 322 that is configured with instructions executable by a processor to obtain point cloud data (e.g., point cloud data-1 314a and point cloud data-2 314b) and extract features of each partial point cloud. In some implementations, feature extraction instruction set 322 identifies local features and global features for each partial point cloud. For example, local feature-based techniques are based on local geometric features extracted from the interest points and are more robust to clutter and partial occlusions that are frequently present in a real-world scene. Whereas, global feature-based techniques are based on the whole visual appearance of the object and are suitable for model retrieval and 3D shape classification especially with the weak geometric structure.

In an example implementation, the point cloud registration instruction set 320 includes an extracted feature concatenation instruction set 324 that is configured with instructions executable by a processor to (1) obtain local and global features from each point cloud (e.g., partial point cloud 312a and 312b) from the feature extraction instruction set 322, (2) replicate the global features from a first point cloud (e.g., partial point cloud 312a), and then (3) concatenate them with the global features and the local features from a second point cloud (e.g., partial point cloud 312b). The concatenation of the global and local features is further described herein with reference to the conditional point cloud generation network in FIG. 4.

In an example implementation, the point cloud registration instruction set 320 further includes a 3D transformation prediction instruction set 326 that is configured with instructions executable by a processor to obtain the point cloud concatenation data from the extracted feature concatenation instruction set 324. Additionally, the 3D transformation prediction instruction set 326 can predict the 3D transformation parameters (e.g., rotation and translation) for one or more partial point clouds. The prediction can occur by bypassing the combinatorial matching and is based on the dense correspondence between the first set of 3D points in the first coordinate system and the predicted location of the first set of 3D points in the second coordinate system. The prediction of the 3D transformation parameters is further described herein with reference to the transform estimation network in FIG. 4.

FIG. 4 illustrates an example process flow for training a partial point cloud registration network 400 for two partial point clouds in accordance with some implementations. The goal of the partial point cloud registration network 400 is to find rotation and translation parameters, $R_{21}$ and $t_{21}$, which align the partial point cloud $X_2 \in \mathbb{R}^{3 \times N}$ observed at view 2 with $X_1 \in \mathbb{R}^{3 \times N}$ observed at view 1, i.e. $R_{21}X_2+t_{21}$, without any prior knowledge of the geometry of the rigid object. As shown in FIG. 4, a deep convolutional neural network is constructed and trained with ground truth labels. The partial point cloud registration network 400 may include four parts: do-and-undo of the random rotation layer (e.g., stages 404, 416), a shared encoder (e.g., stage 408), a conditional point cloud generation network (e.g., stages 410, 412), and a transform estimation network (e.g., stage 418). In some implementations, N points are sampled before feeding the point cloud to the partial point cloud registration network 400.

In some implementations, at an initial stage 402, partial point clouds $X_1$ and $X_2$ are obtained. For example, point cloud $X_1$ can be captured at a first point of view (e.g., a first point of view as shown in image 310a of FIG. 3), and point cloud $X_2$ can be captured at a second point of view (e.g., a second point of view as shown in image 310b). Then, a random rotation layer at stage 404 randomly rotates each point cloud $X_1$ and $X_2$ as shown in stage 406. The conditional point cloud generation for $P_{21}$ has the rotation and translation invariant property. It is because the correct location of $X_2$ in viewpoint 1 should only be determined by the shape of $X_1$ and $X_2$. Therefore, during training, the rotation and translation invariant property can be exploited by adding the random rotation layer for both inputs as shown in FIG. 4. The translation invariant part is automatically handled during point cloud normalization, i.e., subtracting the mean. The random rotation is undone at stage 412 after the network predicts $P_{21}$ so that $R_{21}$ and $t_{21}$ can be estimated with the original orientations of the input.

In some implementations, at stage 408, a point cloud encoder maps input point cloud $X_1$ to the per-point local feature $f_1^l \in \mathbb{R}^{N \times d}$ and global feature $f_1^g \in \mathbb{R}^{1 \times d}$. The same encoder is applied to the other input $X_2$ with shared parameters to get $f_2^l$ and $f_2^g$. In some implementations, both point clouds are zero-centered and normalized to a $[-0.5, 0.5]^3$ cube by dividing with a common scale factor before the point clouds are sent to the encoder at stage 408. The scale factor can be determined by the maximum value of zero-centered point clouds for each axis. The mean of each point cloud, $\mu(X_1)$ and $\mu(X_2)$, and the scale factor S to denormalize the point cloud are stored for later user by the algorithm.

In some implementations, at stages 410 and 412, a conditional point cloud generation network (e.g., extracted feature concatenation instruction set 324 of FIG. 3) obtains $f_1^g$, $f_2^g$, and $f_2^l$ as input and outputs the predicted location of $X_2$ at viewpoint 1, i.e., $P_{21}$. The global features can be replicated and concatenated with the local feature to form an input at stage 410. The conditional point cloud generation network can be described as a generator which reconstructs the shape of $X_2$ using $f_2^g$, and $f_2^l$ while conditioning on the $f_1^g$ to put it at the viewpoint 1. Both $P_{21}$ and $f_2^l$ preserve the ordering of $X_2$ since 1×1 convolutions are used, which do not change the ordering of points. The preservation of the ordering of $X_2$ establishes dense correspondences between $X_2$ and $P_{21}$ which can be useful for the transform estimation network (e.g., stage 418) to estimate rigid transform parameters (e.g., rotation and translation). In some implementations, a hyperbolic tangent activation function can be used after the last layer's output to contain predicted locations within $[-1, 1]^3$ cube. In some implementations, the generated point cloud can be denormalized based on the previously stored normalization parameters $\mu(X_1)$ and S to bring the generated point cloud to viewpoint 1, i.e., to obtain $P_{21}$.

In some implementations, at stage 418, a transformation estimation network (e.g., 3D transformation prediction instruction set 326 of FIG. 3) obtains two point clouds $X_2$ and $P_{21}$ with dense correspondences, and can estimate rotation and translation parameters. For example, the transformation estimation network receives as input the point-wise concatenation of $X_2$ and $P_{21}$ and predicts the rotation in the form of quaternion. The rotation axis $n=\{n_x, n_y, n_z\}$ and rotation angle $\square$ of a quaternion vector can be parameterize using the equation:

$$q = \left(\cos\frac{\pi\sigma(\theta)}{2}, \sin\frac{\pi\sigma(\theta)}{2}\frac{n}{\|n\|}\right)$$

where $\square$ is the sigmoid activation function to represent the rotation $R_{21}$ on the positive real hemisphere and $$\|n\| = \sqrt{n_x^2 + n_y^2 + n_z^2}.$$

Then, the estimated translation can be calculated as $t_{21}=\mu(P_{21})-R_{21}\mu(X_2)$. Using the predicted $R_{21}$ and $t_{21}$, $X_2$ can be moved to viewpoint 1. The transformed point cloud can be denoted from viewpoint 2 to viewpoint 1 using the estimated transformation as $X_{21}$. In some implementations, before feeding $X_2$ and $P_{21}$ to the transform estimation network, they can be normalized together based on the same normalization method used in the point cloud encoder as described herein.

In some implementations, the partial point cloud registration network 400 (e.g., a neural network) is trained with the following objective function to transform $X_2$ to view 1:

$$\mathcal{L}_{21}=\mathcal{L}_{R,t}(R_{21},t_{21},R^*_{21},t^*_{21})+\mathcal{L}_{3D}(P_{21},X_{21},X^*_{21})$$

where $\mathcal{L}_{R,t}$ regulates the error in the rotation and translation parameter space and $\mathcal{L}_{3D}$ describes the distance in the 3D space. In addition, $R^*_{21}$ and $t^*_{21}$ are the ground truth rotation matrix and translation vector and $X^*_{21}$ is $X_2$ transformed by $R^*_{21}$ and $t^*_{21}$.

In some implementations, the partial point cloud registration network 400 can account for rotation and translation loss. For example, the partial point cloud registration network 400 can minimize $\|(E^*_{21})^{-1}E^*_{21}-I\|$ where $E=[R|t]\in \mathbb{R}^{4\square 4}$ is an extrinsic matrix and I is the identity matrix. For the type of the norm, tested $L_1$, $L_2$, and $L_s$ (e.g., shrinkage loss) can be tested using the partial point cloud registration network 400. In some implementations, $L_s$ norm can be used for regression losses to achieve better results than other norms.

In some implementations, the partial point cloud registration network 400 can account for distance loss in 3D space. For example, the partial point cloud registration network 400 can include two types of distance losses between point clouds. First, the partial point cloud registration network 400 can use average distance of model points which measures 3D distance between two point clouds that are transformed by two different rotations and translations as follows:

$$\frac{1}{N}\sum_{x\in X_2} \|R_{21}x+t_{21})-(R^*_{21}x+t^*_{21}\| = \frac{1}{N}\sum_{x_{21}\in X_{21}, x^*_{21}\in X^*_{21}} \|X_{21}-X^*_{21}\|,$$

where N is the number of points, and $\mathcal{L}_{R,t}$ helps to minimize the error of transform parameters. The second distance loss is designed to predict correct $P_{21}$ as follows:

$$\frac{1}{N}\sum_{P_{21}\in P_{21}, X^*_{21}\in X^*_{21}} \|P_{21}-X^*_{21}\|$$

In some implementations, the partial point cloud registration network 400 can directly calculate $P_{21}-X^*_{21}$ without finding point-to-point matching as they already have dense correspondences.

In some implementations, the partial point cloud registration network 400 can account for final loss. For example, the partial point cloud registration network 400 can consider bi-directional transform and a cyclic loss as follows:

$$\mathcal{L}_{cyc}=\|X_1-(R_{21}X_{12}+t_{21})\|+\|X_2-(R_{12}X_{21}+t_{12})\|$$

In some implementations, the partial point cloud registration network 400 can be end-to-end trainable using the loss function.

Figure 5:
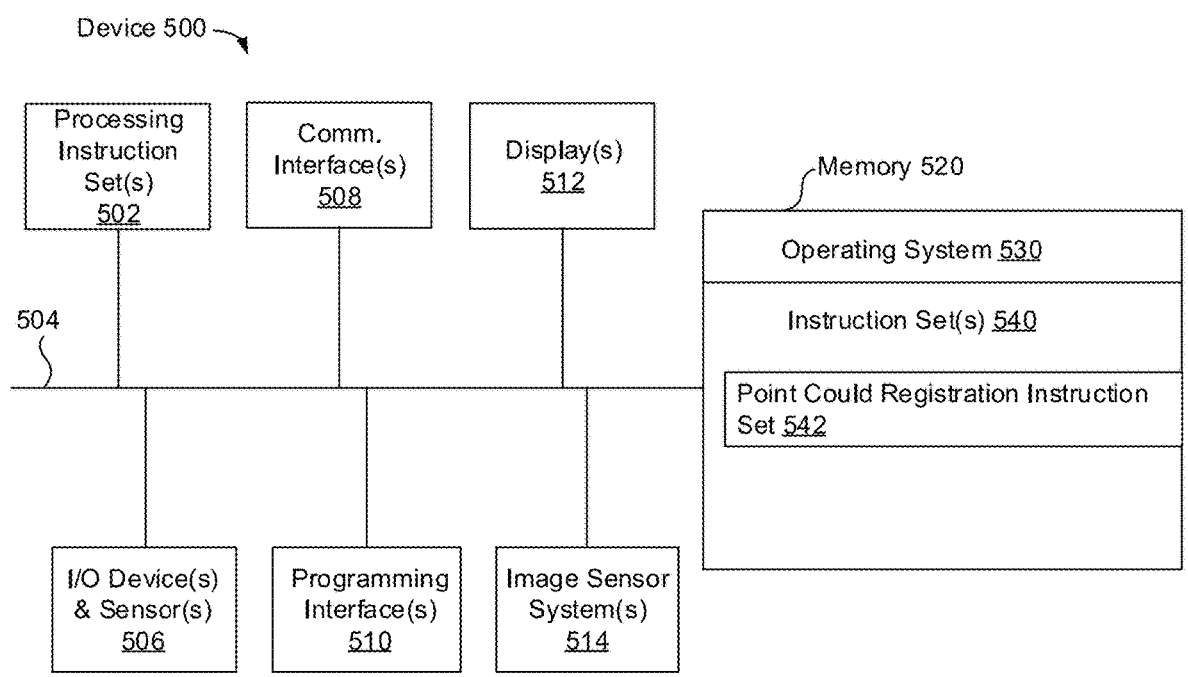
FIG. 5 is a block diagram of an exemplary device in accordance with some implementations.

FIG. 5 is a block diagram of an example device 500. Device 500 illustrates an exemplary device configuration for device 120 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units 502 (e.g., microprocessors, ASICs, FPGAs, GPUs, CPUs, processing cores, and/or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 510, one or more displays 512, one or more interior and/or exterior facing image sensor systems 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 512 are configured to present a view of a physical environment or a graphical environment to the user. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 512 correspond to diffractive, reflective, polarized, holographic, etc. waveguide displays. In one example, the device 500 includes a single display. In another example, the device 500 includes a display for each eye of the user.

In some implementations, the one or more image sensor systems 514 are configured to obtain image data that corresponds to at least a portion of the physical environment 105. For example, the one or more image sensor systems 514 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 514 further include illumination sources that emit light, such as a flash. In various implementations, the one or more image sensor systems 514 further include an on-camera image signal processor (ISP) configured to execute a plurality of processing operations on the image data.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 includes a non-transitory computer readable storage medium.

In some implementations, the memory 520 or the non-transitory computer readable storage medium of the memory 520 stores an optional operating system 330 and one or more instruction set(s) 540. The operating system 530 includes procedures for handling various basic system services and for performing hardware dependent tasks. In some implementations, the instruction set(s) 540 include executable software defined by binary information stored in the form of electrical charge. In some implementations, the instruction set(s) 540 are software that is executable by the one or more processing units 502 to carry out one or more of the techniques described herein.

The instruction set(s) 540 include a point cloud registration instruction set 542. The instruction set(s) 540 may be embodied as a single software executable or multiple software executables.

The point cloud registration instruction set 542 (e.g., point cloud registration instruction set 320 of FIG. 3) is executable by the processing unit(s) 502 to implement a machine learning model such as a neural network. In some implementations, the point cloud registration instruction set 542 includes instructions that are executed to implement a neural network to determine transformation parameters (e.g., rotation and translation) relating to two or more partial point clouds. In some implementations, the machine learning model is trained, e.g., using a training data set, on device 500. In some implementations the machine learning model is trained on a separate device. In some implementations, the machine learning model is trained initially on a separate device and then on device 500, for example, via a reinforcement learning or other continuing training technique. In some implementations, the point cloud registration instruction set 542 may include a feature extraction instruction set (e.g., extract features of each partial point cloud associated with an object), an extracted feature concatenation instruction set (e.g., a concatenation layer that replicates global features from a first point cloud and then concatenates them with global features and local features from a second point cloud), and a 3D transformation prediction instruction set (e.g., estimates rotation and translation parameters). Exemplary techniques for partial point cloud registration are discussed in more detail with respect to FIGS. 4 and 5.

Although the instruction set(s) 540 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Some implementations disclosed herein provide techniques that integrate information (e.g., partial point clouds) from an arbitrary number of images of a scene captured from arbitrary views (e.g. viewpoint-1 102*a* and viewpoint-2 102*b*). In some implementations, techniques disclosed herein are used to estimate transform parameters for the partial point clouds using two or more images, e.g., images captured by a mobile device, HMD, laptop, or other device (e.g., device 120) captured from two different points of view. The techniques may utilize machine learning models including deep learning models that inputs two partial point clouds and directly predicts the point-wise location of one point cloud in the other's coordinate system without explicit matching. Deep learning may be applied to each of partial point clouds to generate a latent representation of the estimated transform parameters. In some implementations, a deep learning model generates an associated confidence level for each of the latent values. Using the predictions and confidence values from the different images, the techniques can combine the results to produce a single estimate of each of the transform parameters for the partial point clouds.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the disclosure are to be understood as being in every respect illustrative and exemplary, but not restrictive, and the scope of the disclosure disclosed herein is not to be determined only from the detailed description of illustrative implementations but according to the full breadth permitted by patent laws. It is to be understood that the implementations shown and described herein are only illustrative of the principles of the present disclosure and that various modification may be implemented by those skilled in the art without departing from the scope and spirit of the disclosure.

What is claimed is:

1. A method comprising:
at an electronic device having a processor:
obtaining a first set of three-dimensional (3D) points corresponding to an object in a physical environment, the first set of 3D points having locations in a first coordinate system;
obtaining a second set of 3D points corresponding to the object in the physical environment, the second set of 3D points having locations in a second coordinate system;
predicting, via a machine learning model, locations of the first set of 3D points in the second coordinate system; and
determining transform parameters relating the first set of 3D points and the second set of 3D points based on the predicted locations of the first set of 3D points in the second coordinate system.

2. The method of claim 1, wherein the first set of 3D points and the second set of 3D points are obtained via a depth sensor.

3. The method of claim 1, wherein the second coordinate system is different than the first coordinate system.

4. The method of claim 1, wherein the first set of 3D points are obtained at a first viewpoint and the second set of 3D points are obtained at a second viewpoint different than the first viewpoint.

5. The method of claim 1, wherein the first set of 3D points are obtained at a first viewpoint and the second set of 3D points are obtained at a second viewpoint that is the same as the first viewpoint.

6. The method of claim 1, wherein the machine learning model is a neural network.

7. The method of claim 6, wherein the first set of 3D points comprises a particular order and the neural network outputs the locations of the first set of 3D points in the second coordinate system such that the order of the first set of 3D points is preserved.

8. The method of claim 6, wherein the neural network is trained to encode features corresponding to the object and generate the predicted locations of the first set of 3D points based on the encoded features.

9. The method of claim 1, further comprising and preceding predicting the locations of the first set of 3D points in the second coordinate system via the machine learning model:
determining local and global features of the first and second set of 3D points.

10. The method of claim 9, wherein the predicted locations of the first set of 3D points are based on the local and the global features of the first set of 3D points and the global features of the second set of 3D points.

11. The method of claim 1, further comprising:
predicting, via the machine learning model, locations of the second set of 3D points in the first coordinate system.

12. The method of claim 1, further comprising:
obtaining two or more sets of 3D points corresponding to the object in the physical environment, where each of the two or more sets of 3D points have locations in a respective coordinate system;
predicting, via the machine learning model, locations of the first set of 3D points in each of the two or more coordinate systems associated with the two or more sets of 3D points; and determining transform parameters relating the first set of 3D points and each of the two or more sets of 3D points based on the predicted location of the first set of 3D points in each of the two or more coordinate systems associated with the two or more sets of 3D points.

13. The method of claim 1, further comprising and preceding predicting the locations of the first set of 3D points in the second coordinate system via the machine learning model:
randomly rotating a viewpoint of at least one of the first set of 3D points and the second set of 3D points; and
predicting the locations of the first set of 3D points in the second coordinate system based on the random rotation of the viewpoint of the at least one of the first set of 3D points and the second set of 3D points.

14. The method of claim 13, further comprising and preceding determining the transform parameters relating the first set of 3D points and the second set of 3D points:
reversing the random rotation of the viewpoint of the at least one of the first set of 3D points and the second set of 3D points.

15. The method of claim 1, wherein the transform parameters comprise at least one of rotation parameters and translation parameters.

16. The method of claim 1, wherein predicting the locations of the first set of 3D points and/or determining the transform parameters are performed via one or more neural networks trained using ground truth data that includes: (i) known transform parameters, and (ii) one or more distance losses based on a measured distance between a ground set of 3D points transformed based on the determined transform parameters and the known transform parameters.

17. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining a first set of three-dimensional (3D) points corresponding to an object in a physical environment, the first set of 3D points having locations in a first coordinate system;
obtaining a second set of 3D points corresponding to the object in the physical environment, the second set of 3D points having locations in a second coordinate system;
predicting, via a machine learning model, locations of the first set of 3D points in the second coordinate system; and
determining transform parameters relating the first set of 3D points and the second set of 3D points based on the predicted locations of the first set of 3D points in the second coordinate system.

18. The system of claim 17, wherein the first set of 3D points and the second set of 3D points are obtained via a depth sensor.

19. The system of claim 17, wherein the second coordinate system is different than the first coordinate system.

20. A non-transitory computer-readable storage medium, storing program instructions executable on a device to perform operations comprising:
obtaining a first set of three-dimensional (3D) points corresponding to an object in a physical environment, the first set of 3D points having locations in a first coordinate system;
obtaining a second set of 3D points corresponding to the object in the physical environment, the second set of 3D points having locations in a second coordinate system;
predicting, via a machine learning model, locations of the first set of 3D points in the second coordinate system; and
determining transform parameters relating the first set of 3D points and the second set of 3D points based on the predicted locations of the first set of 3D points in the second coordinate system.

* * * * *